(12) United States Patent
Kopecki et al.

(10) Patent No.: US 6,710,600 B1
(45) Date of Patent: *Mar. 23, 2004

(54) DRILLPIPE STRUCTURES TO ACCOMMODATE DOWNHOLE TESTING

(75) Inventors: Denis S. Kopecki, Spring, TX (US); MacMillian M. Wisler, Kingwood, TX (US); Hendrik John, Celle (DE)

(73) Assignee: Baker Hughes Incorporated, Houston, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/080,413

(22) Filed: May 18, 1998

Related U.S. Application Data

(63) Continuation-in-part of application No. 08/786,060, filed on Jan. 21, 1997, now Pat. No. 6,288,458, which is a continuation of application No. 08/283,933, filed on Aug. 1, 1994, now abandoned.

(51) Int. Cl.$^7$ .............................. G01V 3/00; E21B 17/00
(52) U.S. Cl. ......................... 324/338; 175/320
(58) Field of Search ................. 324/338, 339, 324/346, 356, 369, 333; 175/320; 166/242.1; 138/140

(56) References Cited

U.S. PATENT DOCUMENTS

| | | |
|---|---|---|
| 2,681,567 A | 6/1954 | Widess |
| 2,941,784 A | 6/1960 | Martin |
| 3,293,542 A | 12/1966 | Piety |
| 4,126,848 A | 11/1978 | Denison |

(List continued on next page.)

FOREIGN PATENT DOCUMENTS

| | | |
|---|---|---|
| EP | 0274457 A2 | 7/1988 |
| EP | 0816632 A1 | 7/1998 |
| GB | 2 242 462 A | 10/1991 |
| WO | WO97/21117 A1 | 6/1997 |
| WO | WO 98/06924 | 2/1998 |

*Primary Examiner*—Walter E. Snow
(74) *Attorney, Agent, or Firm*—Steve Rosenblatt

(57) ABSTRACT

A drill collar structure to facilitate measurement-while-drilling (MWD) techniques while at the same time having sufficient rigidity to facilitate the drilling operation is disclosed. In some embodiments, a metal structure involving openings such as slots, preferably oriented longitudinally along its axis, but also in other configurations, are disclosed to allow sufficient strength while at the same time allowing exit and entrance of electromagnetic energy. A composite structure is also disclosed which, for given layers, has adjacent fibers such as glass and carbon, so that when the layers are overlapped, glass areas overlap glass areas throughout the radial thickness of the composite tube to create "windows" for the entrance and exit of electromagnetic energy. In yet other embodiments, the drill collar can be made of a metallic frame structure with a multiplicity of openings which are filled with a composite material. The metallic frame structure provides structural rigidity while the openings, filled with composite material which are attached to the metal structure, form a fluid-tight cohesive structure sufficient to withstand the rigors of drilling, while at the same time allow the measurements of the formation to be taken through the windows or by making use of sensors embedded in the windows. In another alternative composite structure, carbon fibers can be used if they are electrically insulated in the areas where electromagnetic energy is to enter and exit the structure. Another composite alternative is to alternate carbon and glass fibers in particular sequences or to use insulated carbon fibers to facilitate the operation of instruments which can be mounted in the structure whose operation could be negatively affected by conductivity in the wall in an azimuthal direction.

34 Claims, 8 Drawing Sheets

U.S. PATENT DOCUMENTS

| | | | |
|---|---|---|---|
| 4,139,836 A | | 2/1979 | Chaney et al. |
| 4,336,415 A | | 6/1982 | Walling |
| 4,529,939 A | | 7/1985 | Kuckes |
| 4,584,675 A | | 4/1986 | Peppers |
| 4,620,593 A | | 11/1986 | Haagensen |
| 4,684,946 A | * | 8/1987 | Issenmann .................. 175/50 |
| 5,110,644 A | | 5/1992 | Sparks et al. |
| 5,123,492 A | | 6/1992 | Lizanec, Jr. |
| 5,130,706 A | | 7/1992 | Van Steenwyk |
| 5,132,624 A | * | 7/1992 | Kitson ....................... 324/339 |
| 5,157,331 A | * | 10/1992 | Smith ......................... 324/338 |
| 5,172,765 A | | 12/1992 | Sas-Jaworsky et al. |
| 5,202,680 A | | 4/1993 | Savage |
| 5,214,251 A | | 5/1993 | Orban et al. |
| 5,234,058 A | | 8/1993 | Sas-Jaworsky et al. |
| 5,250,806 A | | 10/1993 | Rhein-Knudsen et al. |
| 5,332,049 A | | 7/1994 | Tew |
| 5,339,036 A | * | 8/1994 | Clark et al. .................. 324/369 |
| 5,467,083 A | | 11/1995 | McDonald et al. |
| 5,524,708 A | | 6/1996 | Isaacs |
| 5,563,512 A | * | 10/1996 | Mumby ...................... 324/338 |
| 5,944,124 A | * | 8/1999 | Pomerleau et al. ......... 175/320 |
| 5,945,923 A | | 8/1999 | Soulier |
| 6,288,548 B1 | * | 9/2001 | Thompson et al. ......... 324/339 |

* cited by examiner

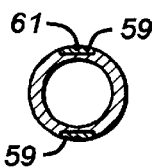
FIG. 11  FIG. 13  FIG. 15
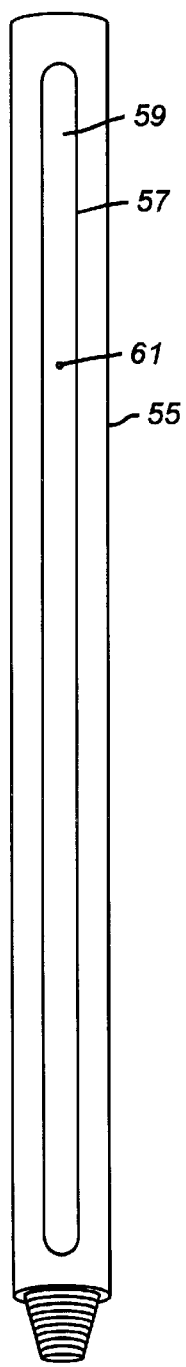
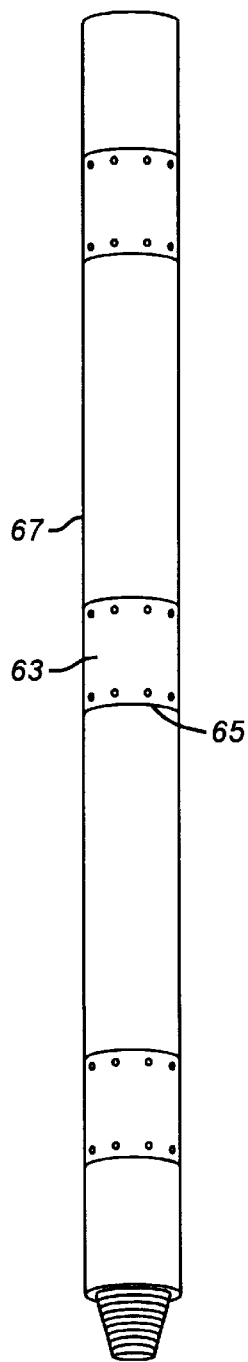
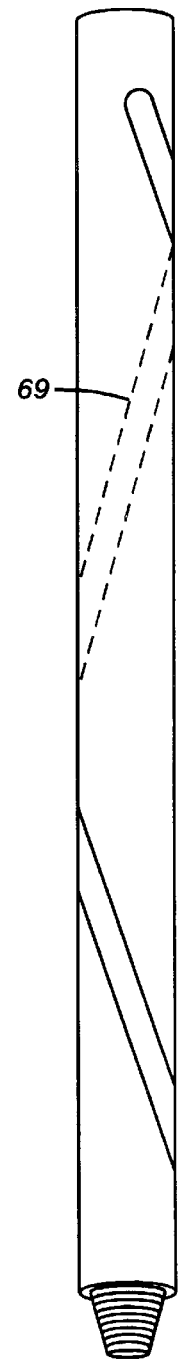
FIG. 10  FIG. 12  FIG. 14

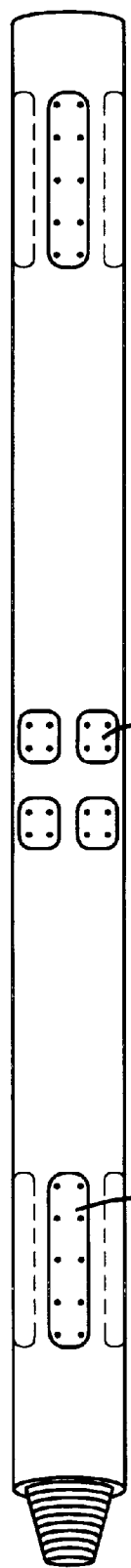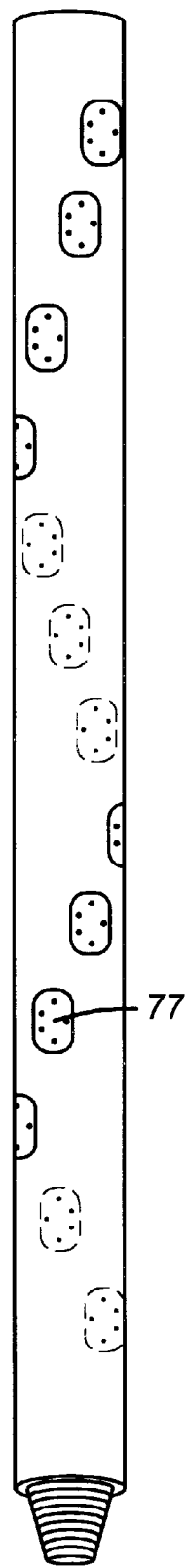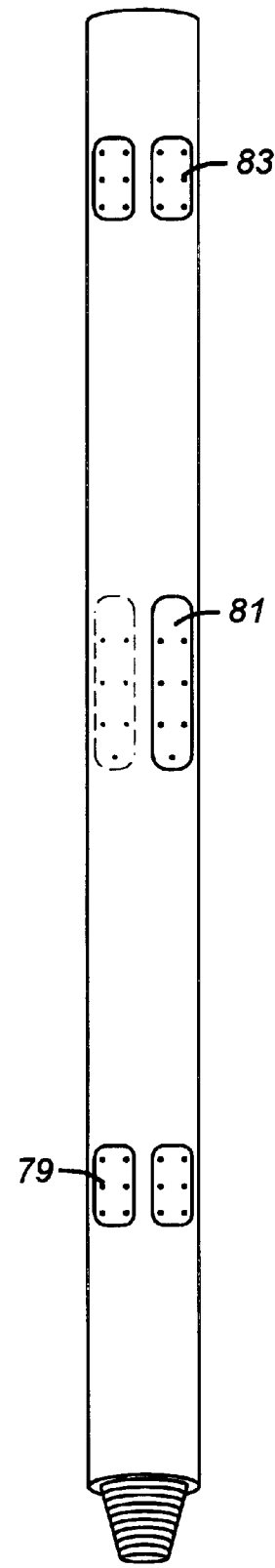
FIG. 16　　FIG. 17　　FIG. 18

DRILLPIPE STRUCTURES TO ACCOMMODATE DOWNHOLE TESTING

This application is a continuation-in-part of application Ser. No. 08/786,060 entitled "Method and Apparatus for Interrogating a Borehole" filed Jan. 21, 1997 now U.S. Pat. No. 6,288,458, which is, in turn, a continuation of application Ser. No. 08/283,933 filed Aug. 1, 1994 now abandoned.

FIELD OF THE INVENTION

The field of this invention relates to drillpipe structures which can accommodate the loads imposed during drilling, while at the same time facilitate making a variety of measurements while drilling.

BACKGROUND OF THE INVENTION

Present drilling technology incorporates a metal tubular connecting the surface drilling equipment to the drill bit at the bottom of the well One of the difficulties in the design of measurement-while-drilling (MWD) tools is that they need to be attached to the drill string without undue encumbrances of the drilling operation. The bottom of the drill string where the MWD tools are located is usually composed of metal tubulars called collars, which have to provide mechanical integrity and sometimes weight to the drill string while conveying drilling fluid from the surface to the bit. MWD sensors are either mounted on and integral to the collar or are housed in a central package inside the bores of the collars. Certain formation sensor transducers, such as formation resistivity sensor antennas, are restricted from being located inside the collar bores because the metal walls seriously degrade their ability to measure wellbore parameters outside the collars. This inability to "see through" the collar walls usually causes certain MWD tools to be more expensive to build and maintain than central "sonde"-based tools.

Antennas which are housed or attached to the various components of the drill string are used in MWD applications either to enable measurements of electrical parameters in the downhole environment or to enable communication of information with the surface or other drill string components. A challenge in making an antenna go downhole in a drilling environment requires satisfaction of both electrical and mechanical constraints. One particular type of antenna is the transverse electric type in which current flows around the drill string component in which the antenna is contained. The drill string component is usually a drill collar and the result of the current flow is to induce, in the case of a transmitting antenna, a magnetic field in the region around the antenna. In the situation of a receiving antenna, the magnetic field, which is locally axial in a direction along the drill string, induces current in the antenna element or elements which are around the drill string component in an azimuthal direction. Transmitting and receiving antennas are similar in construction, the difference being the direction of energy flow. A gap has to be maintained between the azimuthal current element and the high-conducting drill string in order for the magnetic field to encircle the element and thereby allow energy flow to or from the downhole environment proximate to the antenna.

One technique in the construction of antennas has been to neck down the highly electrically conducting drill collar in the antenna region, so that the antenna element does not extend out past the radius of the collar in order to protect it from the drilling environment. The region around the antenna element is then covered with electrical non- or semiconducting materials such as fiberglass, ceramic and rubber, to protect the element from the drilling environment. Another design is to neck down the drill collar but to use a slotted mask in place around the antenna element. The mask provides more protection from the drilling environment than other methods and the mask also provides electrical shielding necessary in these applications. The axial slots are cut in the mask to allow the magnetic fields to pass from the region inside the metal mask, where the antenna element is contained, to the region out-side so that the fields may be either received or caused in the region adjacent the drill string.

These methods involve the weakening of the drill string due to the neck down region which has been described for placement of the antenna. The presence of material in the outer diameter of the drill string is important in determining its strength, which is critical in the smaller drill collar sizes.

Composite drill type has been used as described in U.S. Pat. No. 5,332,049. This type of hybrid structure of a composite with hardened steel end fittings suffers drawbacks of failures at the juncture of the metallic and composite segments. Additionally, such designs of composites have included fibers applied in layers successively over each other, where each layer was made entirely of one kind of fiber, such as carbon or glass fiber. Successive layers were placed one over the other during construction, until the tube was complete. The layers which were made entirely of carbon fibers had the disadvantage that they prevented the passage of electromagnetic energy. Other constructions which involved composites used to provide strength to resist internal pressures are known but are unsuitable for drilling application. Some examples of such construction for cables or tubular goods employing layers of composite materials include U.S. Pat. Nos. 5,110,644, 5,234,058 and 5,172,765.

Even the composite materials which have been introduced for drilling applications are made of a hybrid glass/carbon fiber-reinforced epoxy and are not conducive to permit electromagnetic energy to exit and reenter in the azimuthal direction for facilitating MWD of such formation features as resistivity.

Accordingly, what is desired and is an objective of the present invention is to provide a drill collar structure that has sufficient structural rigidity to withstand the rigors of drilling. At the same time, the structure should be capable of supporting the MWD equipment, some types of which rely on electromagnetic energy for the measurements taken during drilling activity. Thus, the composite structure of the present invention has the objective of allowing electromagnetic energy to exit and reenter, as well as to facilitate the location and operation of other borehole property measuring equipment, so that the entire assembly functions to allow real-time data of borehole conditions while at the same time facilitating the drilling operation. These objectives have been addressed in a plurality of alternative embodiments which are designed to address the two main criteria of sufficient physical rigidity of the drill collar assembly, while at the same time the facilitation of the measurements needed during the drilling operation.

SUMMARY OF THE INVENTION

A drill collar structure to facilitate measurement-while-drilling (MWD) techniques while at the same time having sufficient rigidity to facilitate the drilling operation is disclosed. In some embodiments, a metal structure involving openings such as slots, preferably oriented longitudinally along its axis, but also in other configurations, are disclosed to allow sufficient strength while at the same time allowing exit and entrance of electromagnetic energy. A composite structure is also disclosed which, for given layers, has adjacent fibers such as glass and carbon, so that when the layers are overlapped, glass areas overlap glass areas throughout the radial thickness of the composite tube to create "windows" for the entrance and exit of electromagnetic energy. In yet other embodiments, the drill collar can be made of a metallic frame structure with a multiplicity of openings which are filled with a composite material. The metallic frame structure provides structural rigidity while the openings, filled with composite material which are attached to the metal structure, form a fluid-tight cohesive structure sufficient to withstand the rigors of drilling, while at the same time allow the measurements of the formation to be taken through the windows or by making use of sensors embedded in the windows. In another alternative composite structure, carbon fibers can be used if they are electrically insulated in the areas where electromagnetic energy is to enter and exit the structure. Another composite alternative is to alternate carbon and glass fibers in particular sequences or to use insulated carbon fibers to facilitate the operation of instruments which can be mounted in the structure whose operation could be negatively affected by conductivity in the wall in an azimuthal direction.

BRIEF DESCRIPTION OF THE DRAWING

FIG. 10 is an elevational view of an elongated window found in a groove on a section of a drill collar, showing an orientation of two windows at 180°.

FIG. 11 is a section view through FIG. 10, showing the location of the windows.

FIG. 12 is an alternative to FIG. 10, showing three spaced-apart bands forming the windows.

FIG. 13 is a section through one of the windows of FIG. 12.

FIG. 14 is yet another alternative, showing a spiral window.

FIG. 15 is a section through FIG. 14.

FIGS. 16, 17, and 18 are further alternative embodiments of window layouts on a metallic drill collar where an opening goes through the wall and is covered.

DETAILED DESCRIPTION OF THE PREFERRED EMBODIMENT

Figure 1:
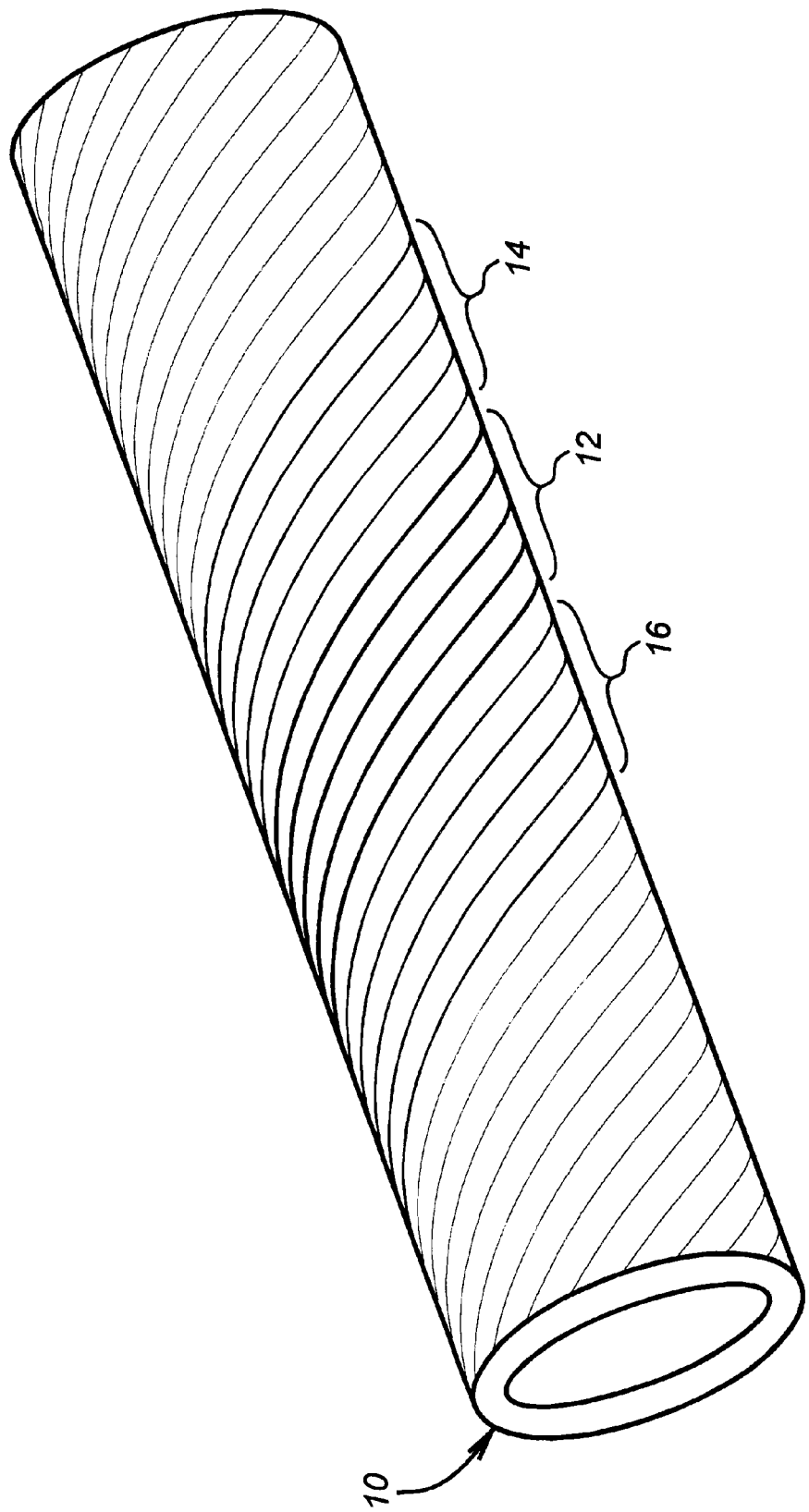
FIG. 1 is a perspective view of a layer making up a piece of a composite tubular drill collar for support of MWD equipment to permit electromagnetic waves to exit and enter.
Figure 2:
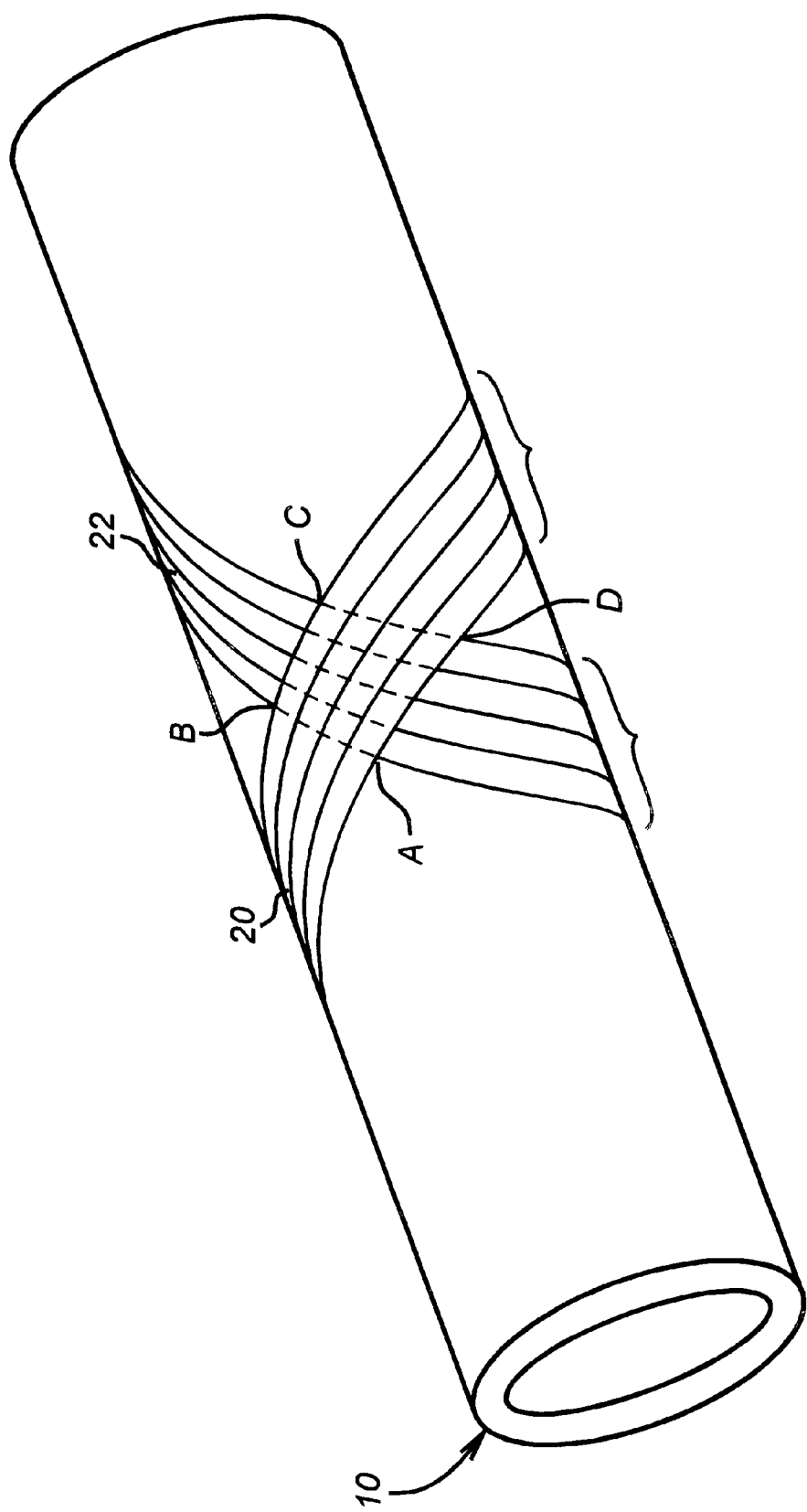
FIG. 2 is a view of FIG. 1, showing overlapping layers of glass fibers creating diamond-shaped windows in the composite structure.
Figure 3:
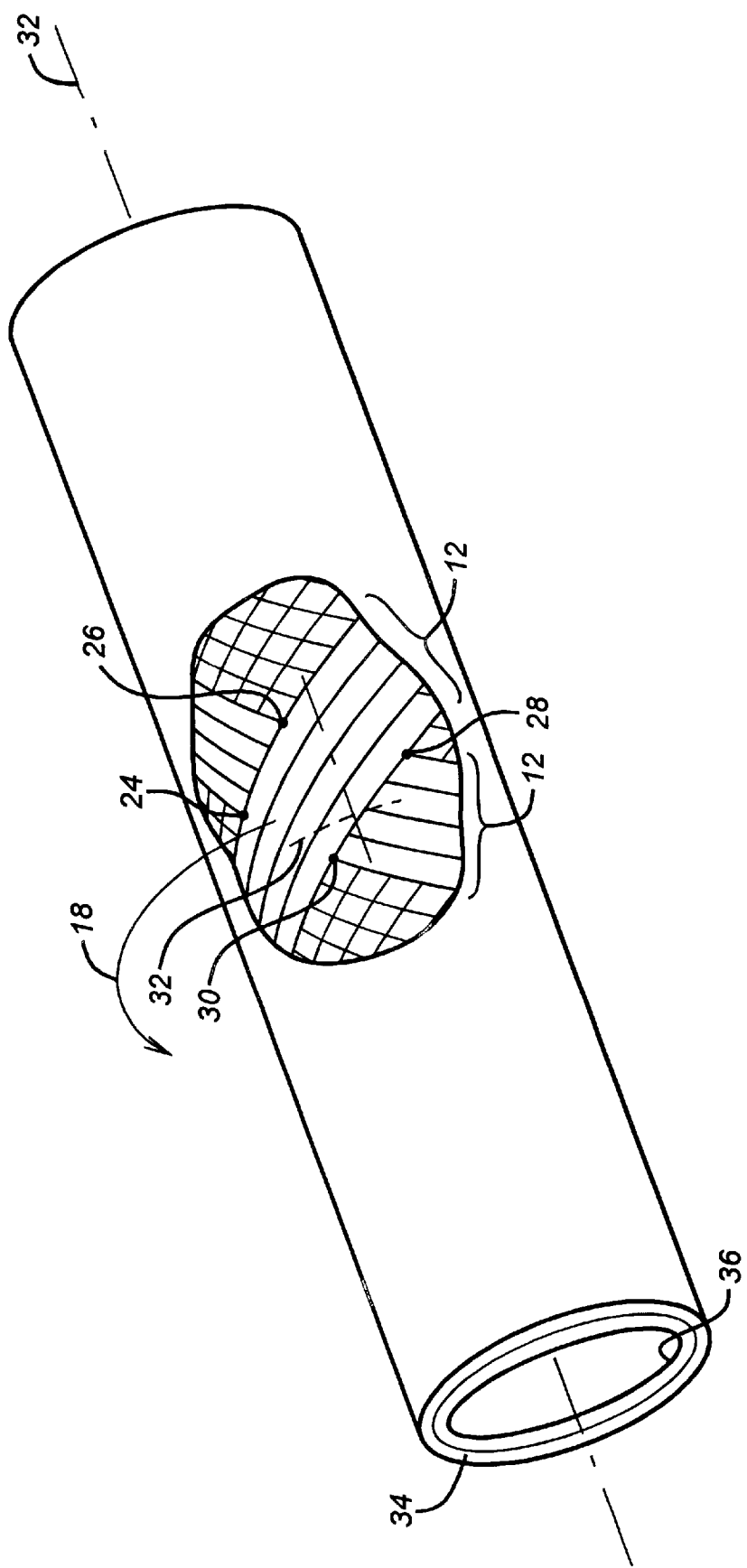
FIG. 3 is a further development of FIG. 2, also in perspective, illustrating how the overlapping glass fibers create windows in the composite drill collar.

One way to address the fabrication of a drill collar 10 with a composite structure, which facilitates the passage of electromagnetic energy through it, is shown in FIGS. 1–3. A single layer is illustrated in FIG. 1, which has a band 12 of glass fibers, in the preferred embodiment sandwiched between bands 14 and 16 of preferably carbon fibers. Those skilled in the art will appreciate that band 12 can be formed from any material that is not a barrier to electromagnetic energy in a helical direction as represented by arrow 18 of FIG. 3. FIG. 2 illustrates the overlay of layers wherein each of the layers 20 and 22 are formed with the alternating pattern depicted in FIG. 1, for example, glass fibers 12 between carbon fibers 14 and 16. The overlay of bands 20 and 22, which are helically wound to create the collar 10 at angles which can vary in a particular design, is to create an overlapping area, shown more specifically by points 24 through 30. Where measured in a radial direction, i.e., at 90° to longitudinal axis 32 and between points 24, 26, 28, and 30, there exist only glass fibers 12, as indicated schematically in FIG. 3 for two adjacent layers. Thus, regardless of the degree of the helix formed by each band, which is itself a function of the ultimate desired structural strength, and regardless of how many bands overlap each other to form the composite which makes up the drill collar 10, the objective is to create a collar 10 to have sufficient structural rigidity to withstand the rigors of drilling and the pressures internally from the circulating mud, while at the same time to create overlapping strips of material which can pass electromagnetic energy as identified by points 24, 26, 28, and 30, also known as "windows." Those skilled in the art will appreciate that depending on the diameter of the drill collar 10 to be produced and the angle used for the helical winding of the individual layers such as 20 and 22, two or more windows in a given elevation will be created. The spacing of the rows of windows is also dependent on the helical angle of the wrap of the bands 20 and 22. However, regardless of how many bands it takes to get the resulting structural rigidity and the ability to withstand internal pressures, the construction techniques illustrated result in the creation of windows at periodic intervals where desired along the length of the collar 10. These windows are at a given elevation along the collar 10 and can pass electromagnetic energy.

Shown schematically as 32 in FIG. 3, the transmitting or receiving antennas can be embedded within the wall 34 of drill collar 10. Alternatively, as disclosed in the related earlier application to which this is an improvement, the transmitting and receiving antennas can be mounted on a separate sonde and placed into position in the drill string within the composite drill collar 10 depicted in FIGS. 1–3. Flow can go around or through the sonde, which is not shown in FIG. 3 but is schematically depicted in FIG. 6A or an alternative embodiment. This application will be described below. However, it is within the scope of the invention to mount the transmitters and receivers or other instrumentation generally within the wall 34 of the drill collar 10 or within the internal bore 36 so that the instrumentation can be separately handled and installed in the collar 10 after the drill string is made up.

Figure 6:
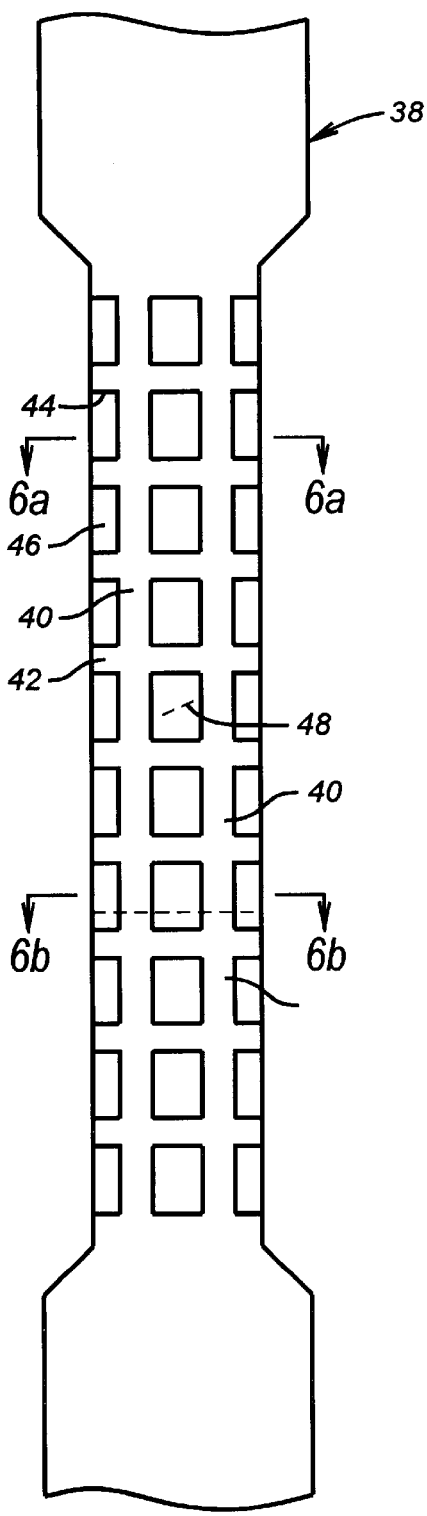
FIG. 6 is an alternative embodiment showing in sectional elevational view a drill collar with a metallic framework defining a plurality of windows which can be filled with composite materials.
Figure 6A:
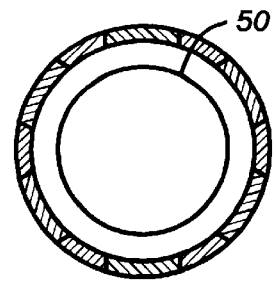

FIG. 6 illustrates an alternative embodiment involving a collar 38, which is generally of a metallic structure comprising a framework of longitudinal members 40 and transverse members 42, which collectively describe a plurality of openings or windows 44. The number of openings is exaggerated to illustrate a particular layout. Fewer openings can be employed. Each of the windows is sealed off with a cover 46 that, in the preferred embodiment, is made from a composite material such that the tubular 38 can conduct drilling fluids to the drill bit. The array of the metallic structure can be varied without departing from the spirit of the invention. The combination of the covers 46 with the longitudinal and transverse members 40 and 42 acts as a unified structure because not only do the covers 46 seal off the openings 44, they interact with the framework of the tubular 38 through the longitudinal and transverse members 40 and 42 to create a unified structure to resist the applied stresses during the drilling operation. The windows 44 can, if made of the right materials, allow for the passage of electromagnetic waves to facilitate the resistivity measurements while drilling. The number and placement of the windows 44 can be adjusted to accommodate the particular MWD instrumentation to be mounted in the collar 38, as well as at the same time to provide sufficient strength for the overall assembly of the collar 38 to withstand the rigors of drilling. The covers 46 can be made of any composite material sufficiently strong to add to the structural strength of the framework of longitudinal and transverse members 40 and 42 and, in certain applications, allow electromagnetic waves to exit and enter to facilitate certain measurements. It can include fiber reinforcement comprising long fibers, short fibers, or particles. The matrix can utilize all types of thermosetting polymers with increased temperature and fluid resistance, thermoplastic polymers with high temperature fluid resistance, ceramics, and also metallic materials if special properties are required. The fibers can be particles of glass, ceramic, and polymers if electromagnetic transparency and electric resistance are required. Carbon fibers, steel fibers, or other conductive materials can be used where no requirements regarding electromagnetic transparency or electric resistance are required. Different combinations of fibers and matrices can be used for the cover 46 to obtain different mechanical and physical properties for a particular application.

Figure 6B:
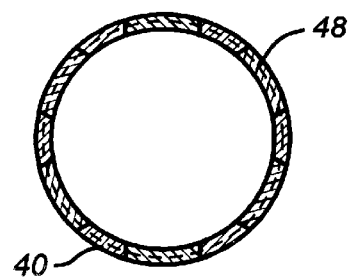

Sensors 48, shown schematically in FIG. 6, can be embedded in the covers 46. Alternatively, as shown in FIG. 6A, a sonde 50 can be inserted into the tubular 38 such that the sensors 48, or antennas or the like, are positioned adjacent to the covers 46 within the tubular 38. Alternatively, as shown in FIG. 6B, the sensors, transmitters or receivers shown schematically as 48 can be mounted within the covers 46 and can actually circumscribe the tubular 38 as the sensors are strung through longitudinal members 40 and into adjacent covers 46, as shown in FIG. 6B. Appropriate installation can be provided around the antenna or other sensor 48 as it goes through the longitudinal member 40.

The type of instrumentation that is used with collar 38 can include electromagnetic, gamma ray density, NMR, acoustic, resistivity, directional, pressure, fiber optic, optical distance chemical analysis (spectroscopy), borehole scope, stress measurement in collar 38 including windows 46, vibration, and other applied mechanical forces.

The arrangement of the openings 44 can vary from that as shown in FIG. 6 without departing from the spirit of the invention. The structure overall must have the requisite rigidity to withstand the rigors of drilling, and the placement of the openings 44 needs to take the structural requirements into account while providing windows at the appropriate location to facilitate the MWD measurements. The sensors 48 can provide information about the surrounding environment outside the collar 38 or about conditions within the collar 38 as well as conditions within the wall of the collar 38, such as the stresses acting on the covers 46 or the structural members 40 and 42. The collar 38 would have the traditional metallic threaded ends so it could be included into a drill string. The covers 46 can be joined to the framework of members 40 and 42 by use of screws, bolts, clamps, or the like. The shape of the openings 44 can vary without departing from the spirit of the invention. Accordingly, a tubular such as 38 can have a series of round holes drilled into it to act as the openings 44 which are filled with composite covers 46.

The structure shown in FIG. 6 and its equivalents can be substantially stronger than a tubular made entirely of composite materials in combination with steel tool joints. Such structures, such as shown in U.S. Pat. No. 5,332,049, in the past have shown weakness and a tendency of stress failure at the transition of the steel tool joint to the composite tube wall body. The type of structure such as illustrated in FIG. 6 by virtue of a metallic base structure can minimize this problem.

Figure 7:
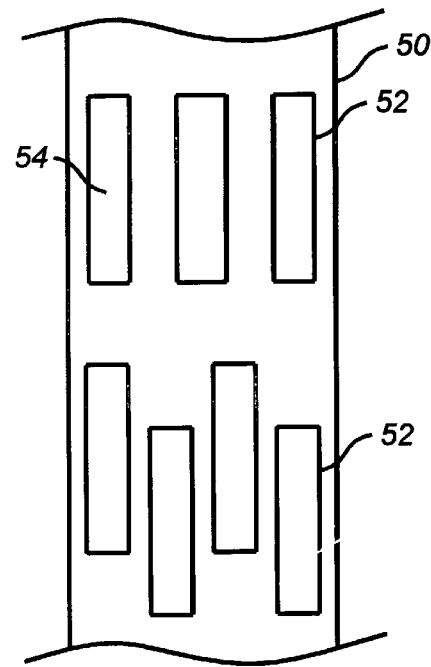
FIG. 7 is a sectional elevational view of a metallic drill collar showing alternative layouts of openings, which can be of a variety of shapes, and in the upper segments shown to be aligned, while in the lower segment are shown to be offset but overlapping.

FIG. 7 is an alternative embodiment illustrating a metallic tubular structure 50 for the collar with a series of longitudinal openings 52. Openings 52 may be in alignment, as shown in the top of FIG. 7, or may be offset, as shown near the bottom of FIG. 7. Other patterns for the openings can also used. The presence of the openings eliminates or reduces conductivity in the azimuthal direction and allows various sensors to be mounted within covers 54, which are in openings 52, or sensors mounted on a sonde (not shown) which can be easily inserted into the drill string from the surface for proper positioning of such elements as antennas in the vicinity of the openings 52. Electromagnetic energy can pass through these openings. The structure in FIG. 7 can also have a composite structure by using carbon and/or glass fibers, for example, in combination with openings such as 52 to further promote the ability to facilitate the workings of instruments employing magnetic dipoles in longitudinal directions or coils oriented in a longitudinal orientation.

FIGS. 10–18 illustrate other alternative embodiments using a tubular structure 55 for the drill collar, wherein windows such as 57, shown in FIG. 10, are accomplished using an outer wall recess into which is disposed a composite material 59. Thus, the strength of using a metallic material or other high-strength material for the tubular 55 is obtained while at the same time, sensors, schematically shown as 61, can be embedded in the composite windows 59. While FIG. 10 illustrates a pair of opposed longitudinal recesses in which the composite windows 59 are mounted, different shapes can be used without departing from the spirit of the invention. Thus, FIG. 12 shows a series of windows 63 which extend in recesses 65 which extend around the periphery of the tubular 67, which preferably of a rigid or metallic structure. FIG. 14 is a variation showing a spiral groove 69 into which the composite window material 71 is mounted. FIGS. 16–18 show similar structures involving recesses or openings through the entire wall, with composite windows in the recesses in a variety of orientations and shapes. In FIG. 16, the middle of the tubular has two rows of four square windows 73, and above and below are individual rows of three oblong windows 75 at 120° from each other. FIG. 17 uses square windows 77 in the spiral pattern, while FIG. 18 shows a bottom row of four oblong windows 79 disposed at 90°, a middle row of oblong windows 81 equally spaced at 180° or 120°, and an upper row of oblong windows 83 at 90° from each other. In the various embodiments of FIGS. 10–15, the underlying drill collar does not have the entirety of its wall removed to create a window. Instead, a recess in its outer surface is provided in any given shapes and arrays on its outer periphery so that the composite material can be inserted therein with the sensors in the composite material or directly beneath it. Some communication opening through the wall or alternatively, exteriorly outside the wall of the tubular, is provided to allow connection of the sensors, such as 61 in FIG. 11, so that the readings obtained can be processed by the downhole equipment, as well as to provide the necessary power supply such as, for example, where a transmitter is located. Power and signals can thus be wired in the wall or wireless communication over a short distance can be used as with a sonde, for example. A sonde can be used to connect signal and power wires to a sensor in the window. A sensor can be on the sonde and extendable to the window through access through an opening in the tubular wall. Accordingly, as used in this specification, "openings" is intended to encompass voids through the wall of the tubular as well as recesses in its outer surface to accommodate a window which is preferably of a composite material.

Figure 5:
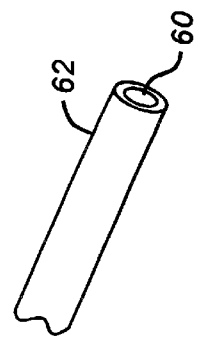
FIG. 5 is a detail of one of the fibers usable in the application of FIG. 4.
Figure 4:
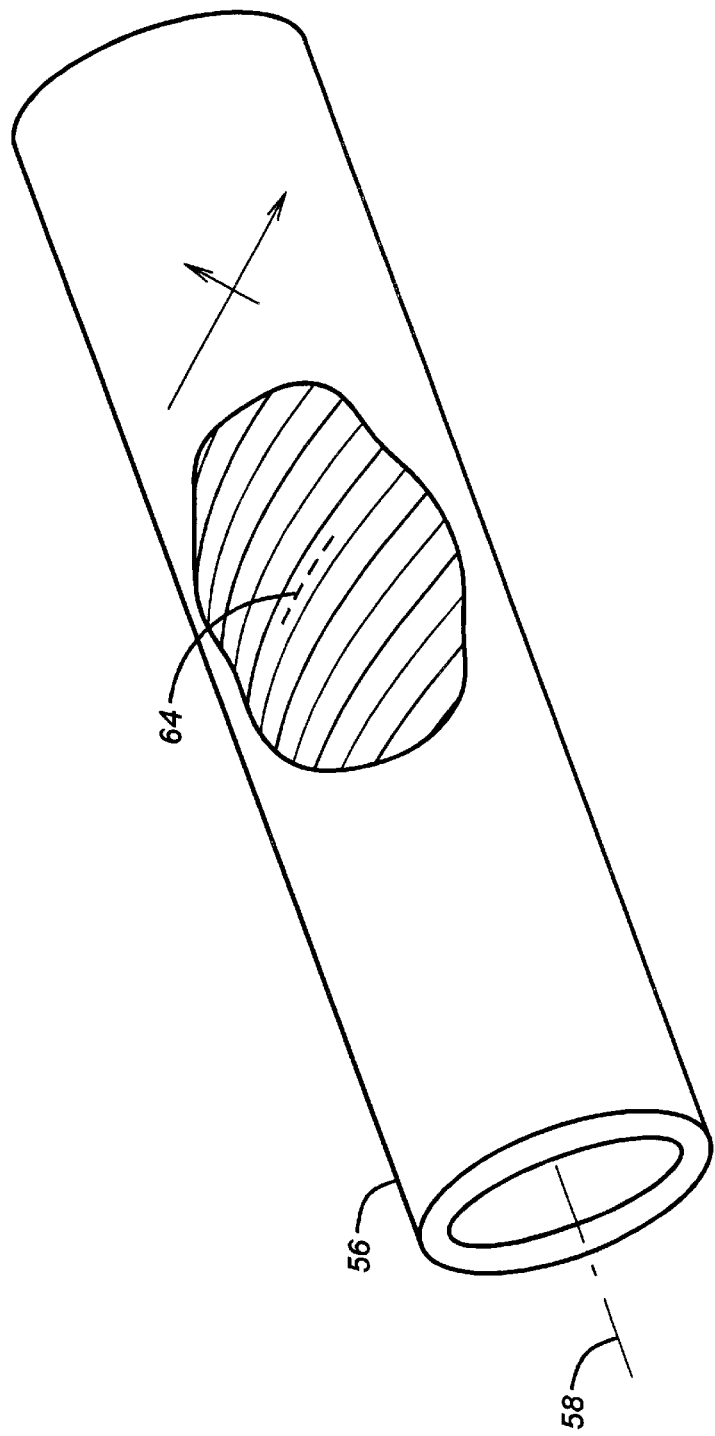
FIG. 4 is an alternative embodiment of a composite drill collar which facilitates MWD by virtue of the fiber orientation of the layers.

Referring now to FIG. 4, another tubular structure for a collar 56 is shown. In the cutaway view, a series of fibers is shown substantially transverse to the longitudinal axis 58. In the cutaway segments, a series of parallel lines represent adjacent fibers which can be oriented in certain predetermined sequences. For example, the fibers can alternate between carbon fiber and glass fiber, where every other fiber is carbon, sandwiched in between a pair of glass fibers. Alternatively, several carbon fibers can be adjacent to each other separated by a glass fiber and the pattern repeating itself. Alternatively, as shown in FIG. 5, carbon fibers 60 can be used which are covered with electrical insulation 62. When so insulated, the carbon fibers, which if helically wrapped would have a vector component in the azimuthal direction, are rendered less conductive in the azimuthal direction due to the insulation.

While the fibers in FIG. 4 are shown nearly transverse (at 90°) to the longitudinal axis 58, other orientations for the fibers of each of the layers can be employed without departing from the spirit of the invention. The significance of the embodiment illustrated in FIG. 4 is that conductivity in the azimuthal direction is reduced, which enhances the effectiveness of the some of the instrumentation for MWD, which can be supported on a sonde internally to the collar 56 or having portions thereof embedded in the wall. The presence of the carbon fibers adds structural strength while the glass fibers constitute blocks to azimuthal conductivity because they form a nonconducting azimuthal gap. Thus, if the carbon fibers are used and coated as shown in FIG. 5, the azimuthal component of any conduction through the carbon fibers is minimized due to the insulative effects of the insulating layer 62. The interspersing of glass fibers between carbon fibers accomplishes the same objective. Conductivity, if the fibers are spirally wound, occurs along the length of the fibers and it has a longitudinal and an azimuthal component. However, the azimuthal component encounters resistance of either the insulation 62 or, in the alternative embodiments, the interspersed glass fibers.

Between the built-up layers which comprise the tubular 56, the antennas 64 which allow for transmission and reception of electromagnetic waves in one embodiment can be placed between or within layers adjacent nonconducting fiber components or poor conducting fiber components in the azimuthal direction. Accordingly, the structure of FIG. 4 is intended to illustrate the use of a composite structure for a tubular 56 wherein the selection and orientation of the fibers is such that conductivity azimuthally is minimized while the structural strength to withstand the rigors of drilling is optimized. By proper orientation and selection of the component fibers within the wall structure of the tubular 56, antennas for resistivity measurement or other test equipment such as nuclear magnetic resonance (NMR) can be employed with minimal interference of the transmitted or received signals due to the construction of the tubular 56, which supports the test equipment. The concept of windows can also be incorporated into the structure of FIG. 4 so that electromagnetic energy can exit and enter.

Figure 8:
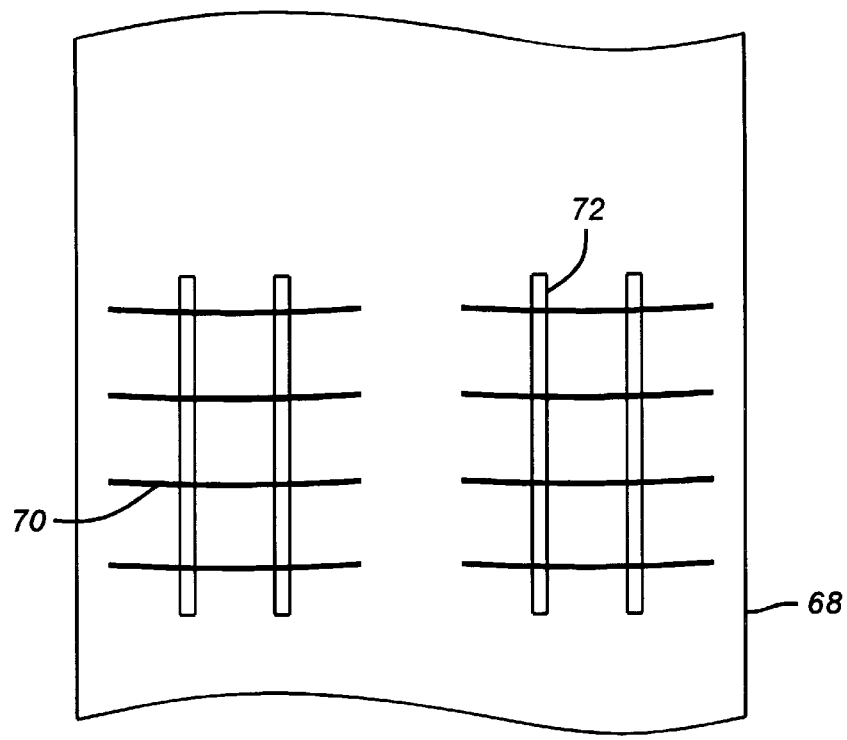
FIG. 8 is an elevational view of a composite drill collar, showing wire loops embedded in the collar.
Figure 9:
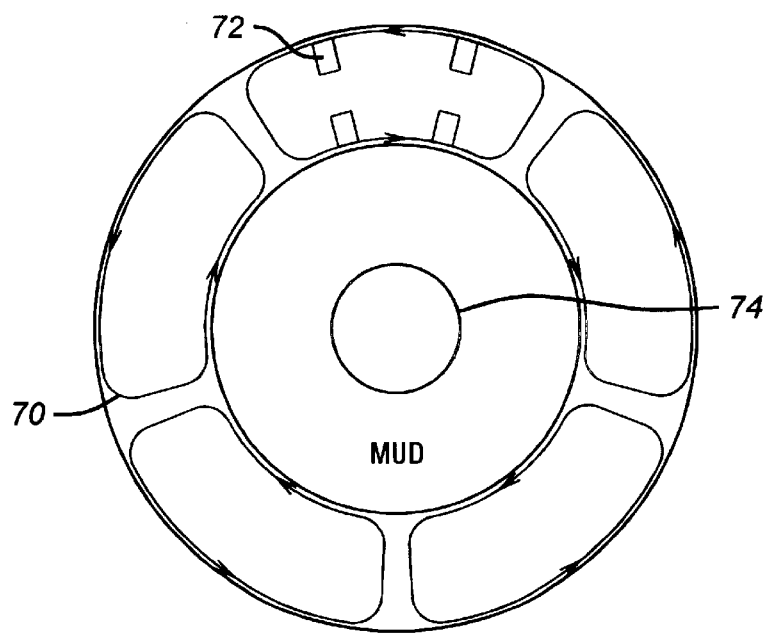
FIG. 9 is a section view through FIG. 8, showing how a sonde-mounted antenna creates a magnetic field which induces current in the wire loops embedded in the composite so as to create a field in the surrounding formation.

FIG. 8 shows an elevational view of a composite drill collar 68, showing a plurality of wire loops 70 embedded in the wall of the collar 68. Short ferrite strips 72 can be used to enhance the performance of the loops 70. As shown in FIG. 9, a sonde-mounted antenna wire 74 is presented within the collar 68 in the area of loops 70. The antenna 74 induces a magnetic field which creates a current in the loops 70 which are embedded in the wall of the composite drill collar 68. The current flowing through the loops 70, in turn, induces a magnetic field in the formation surrounding the drill collar 68. Similar structures located above and/or below on the collar 68 and the sonde supporting the transmitting antenna wire 74 are used as receivers so that the desired formation properties can be measured using this technique. The composite nature of the collar 68, as previously described for the embodiments of FIGS. 1–4, facilitates the operation of the transmitter/receiver system illustrated in FIGS. 7 and 9. By virtue of selection of appropriate materials for the composite wall structure of the collar 68, the interference with the transmitted or received magnetic fields which are induced is minimized.

The foregoing disclosure and description of the invention are illustrative and explanatory thereof, and various changes in the size, shape and materials, as well as in the details of the illustrated construction, may be made without departing from the spirit of the invention.

What is claimed is:

1. A drill pipe, comprising:
   a nonmetallic wall structure having an upper and a lower end, said wall structure defining a flowpath extending from said upper to said lower end and capable of withstanding differential pressure and applied torque and comprising, at least in part, at least one component made of a material which is presented within said structure in a manner as to permit the passage of electromagnetic energy; and
   said wall structure is further formed by a plurality of layers, each layer comprises discrete bands of electromagnetically transparent and non-electromagnetically transparent materials, said wall structure is created by overlapping said layers in a manner that the bands of electromagnetically transparent materials overlap each other to create at least one electromagnetically transparent window.

2. The drill pipe of claim 1, wherein:
   said wall structure is made in part of a composite material.

3. The drill pipe of claim 2, wherein:
   said wall structure comprises a plurality of layers wherein each layer is made in part of material that permits the passage of electromagnetic energy.

4. The drill pipe of claim 3, wherein:
   each overlapping layer is oriented with respect to its adjacent layer so that components made from a material which permits passage of electromagnetic energy overlap, at least in part, in every layer in said wall.

5. The drill pipe of claim 4, wherein:
each layer comprises a plurality of carbon fibers adjacent a plurality of glass fibers.

6. The drill pipe of claim 5, wherein:
said carbon and glass fibers are in alternating bands so that glass fibers in one layer overlap glass fibers in an adjacent layer, such that at least one window of overlapping glass fibers extends through said wall.

7. The drill pipe of claim 1, wherein:
said wall further comprises instrumentation, located adjacent said component which permits passage of electromagnetic energy, said instrumentation uses electromagnetic energy to measure formation properties when the drill pipe is located downhole.

8. The drill pipe of claim 1, further comprising:
a sonde insertable into said flowpath to position instrumentation adjacent said component which permits passage of electromagnetic energy to facilitate use of said instrumentation in testing of a formation using electromagnetic energy when the drill pipe is located downhole.

9. The drill pipe of claim 6, wherein:
said wall further comprises instrumentation located adjacent said window which uses electromagnetic energy to measure formation properties when the drill pipe is located downhole.

10. The drill pipe of claim 6, further comprising:
a sonde insertable into said flowpath to position instrumentation adjacent said window to facilitate testing of a formation using electromagnetic energy when the drill pipe is located downhole.

11. A composite drill pipe to resist conductively in an azimuthal or helical direction, comprising:
a composite tubular wall structure defining a flowpath therein extending from an upper to a lower end thereof and comprising at least in past fibers which, in their position in the wall structure, are not azimuthally conductive or are less azimuthally conductive than other fibers within said wall structure said wall structure comprising sufficient strength to withstand differential pressure and torque imposed during drilling.

12. The drill pipe of claim 11, wherein:
said wall comprises of a plurality of overlapping layers and at least one of said layers comprises an alternating pattern of more-conductive and less-conductive fibers.

13. The drill pipe of claim 12, wherein:
carbon fibers are alternated with glass fibers.

14. The drill pipe of claim 13, wherein:
each carbon fiber is between a glass fiber on either side.

15. The drill pipe of claim 13, wherein:
a plurality of carbon fibers is between at least one glass fiber on either side.

16. The drill pipe of claim 11, wherein:
at least some fibers are insulated to make them less azimuthally conductive than they would be if they were not insulated.

17. The drill pipe of claim 16, wherein:
said insulated fibers comprise carbon fibers.

18. The drill pipe of claim 16, wherein:
some fibers are noninsulated carbon fibers and others are insulated carbon fibers to form azimuthal conductivity gaps.

19. The drill pipe of claim 11, further comprising:
instrumentation mounted, at least in part, in said wall for measuring while drilling with drill pipe where reduced azimuthal conductivity facilitates the measurement.

20. The drill pipe of claim 11, further comprising:
instrumentation mounted to a sonde insertable into said flowpath for measuring while drilling with drill pipe where reduced azimuthal conductivity facilitates the measurement.

21. The drill pipe of claim 13, wherein:
glass fibers overlap in every layer to create windows which allow passage of electromagnetic energy.

22. A drill pipe, comprising:
a tubular metallic structure having a flowpath from an upper to a lower end thereof defining a plurality of voids extending through said structure:
  covers in said voids attached to said tubular structure to allow the assembly of said tubular metallic structure and said covers to withstand pressure differential and applied torque acting on said covers during drilling while facilitating measurements through said voids while drilling, said covers allow passage of electromagnetic energy.

23. Drill pipe, comprising:
a tubular metallic structure having a flowpath from an upper to a lower end thereof defining a plurality of voids extending through said structure:
  covers in said voids attached to said tubular structure to allow the assembly of said tubular metallic structure and said covers to withstand pressure differential and applied torque acting on said covers during drilling while facilitating measurements through said voids while drilling, said covers allow passage of electromagnetic energy; and
  instrumentation mounted at least in part in said covers to facilitate at least one of (1) downhole measurements of the surrounding formation outside said tubular structure, (2) measurements of fluid conditions within the tubular structure, or (3) measurement of the condition of the covers.

24. A drill pipe, comprising:
a tubular metallic structure having a flowpath from an upper to a lower end thereof defining a plurality of voids extending through said structure:
  covers in said voids attached to said tubular structure to allow the assembly of said tubular metallic structure and said covers to withstand pressure differential and applied torque acting on said covers during drilling while facilitating measurements through said voids while drilling, said covers allow passage of electromagnetic energy; and
  instrumentation mounted on a sonde and supported within the tubular structure so that measurements of fluid conditions within said tubular structure or of formation properties outside said tubular structure through said covers can be accomplished.

25. The drill pipe of claim 22, wherein:
said covers are made of a composite material.

26. The drill pipe of claim 25, wherein:
said covers comprise fiber reinforcement.

27. A drill pipe, comprising:
a tubular metallic structure having a flowpath from an upper to a lower end thereof defining a plurality of voids extending through said structure:
  covers in said voids attached to said tubular structure to allow the assembly of said tubular metallic structure and said covers to withstand pressure differential and applied torque acting on said covers during drilling while facilitating measurements through said voids while drilling, said covers allow passage of electromagnetic energy;

said covers allow passage of electromagnetic energy and are made of a composite material with fiber reinforcement;

said voids are elongated and aligned with a longitudinal axis of said metallic structure.

28. A drill pipe, comprising:

a tubular metallic structure having a flowpath from an upper to a lower end thereof defining a plurality of voids extending through said structure:

covers in said voids attached to said tubular structure to allow the assembly of said tubular metallic structure and said covers to withstand pressure differential and applied torque acting on said covers during drilling while facilitating measurements through said voids while drilling, said covers allow passage of electromagnetic energy;

said covers allow passage of electromagnetic energy and are made of a composite material with fiber reinforcement;

said voids are randomly disposed in said structure.

29. The drill pipe of claim 22, wherein:

said structure further comprises metallic thread at each end for connection down to a drill string.

30. The drill pipe of claim 23, wherein:

said instrumentation performs at least one of the following measurements: electromagnetic, gamma ray density, NMR, acoustic, resistivity, directional, pressure, fiber optic, optical distance chemical analysis (spectroscopy), borehole scope, stress measurement in said metallic structure or said covers, vibration, and other applied mechanical forces.

31. The drill pipe of claim 24, wherein:

said instrumentation performs at least one of the following measurements: electromagnetic, gamma ray density, NMR, acoustic, resistivity, directional, pressure, fiber optic, optical distance chemical analysis (spectroscopy), borehole scope, stress measurement in said metallic structure or said covers, vibration, and other applied mechanical forces.

32. The drill pipe of claim 24, wherein:

said instrumentation on said sonde comprises at least one antenna;

said tubular structure comprises at least one electrically conductive loop;

wherein said antenna creates current through said loop by generating a magnetic field, which in turn allows said loop to create a magnetic field into the surrounding formation through said covers.

33. The drill pipe of claim 32, wherein:

said sonde comprises a transmitting antenna to broadcast a magnetic field into the formation using a plurality of said loops and where another antenna receives the magnetic field which returns from the formation.

34. A drill pipe, comprising:

a tubular metallic structure having a flowpath from an upper to a lower end thereof defining a plurality of voids extending through said structure:

covers in said voids attached to said tubular structure to allow the assembly of said tubular metallic structure and said covers to withstand pressure differential and applied torque acting on said covers during drilling while facilitating measurements through said voids while drilling, said covers allow passage of electromagnetic energy;

said covers allow passage of electromagnetic energy and are made of a composite material with fiber reinforcement;

said voids are spirally wound on said structure.

\* \* \* \* \*